United States Patent
Ross

(10) Patent No.: US 10,847,045 B2
(45) Date of Patent: Nov. 24, 2020

(54) MULTISENSORY LEARNING DEVICES AND SYSTEM FOR TEACHING USING THE METHOD OF MULTISENSORY LEARNING

(71) Applicant: Matthew James Ross, Herndon, VA (US)

(72) Inventor: Matthew James Ross, Herndon, VA (US)

(*) Notice: Subject to any disclaimer, the term of this patent is extended or adjusted under 35 U.S.C. 154(b) by 282 days.

(21) Appl. No.: 16/001,611

(22) Filed: Jun. 6, 2018

(65) Prior Publication Data

US 2018/0350247 A1 Dec. 6, 2018

Related U.S. Application Data

(60) Provisional application No. 62/516,097, filed on Jun. 6, 2017.

(51) Int. Cl.
| | |
|---|---|
| *G09B 1/00* | (2006.01) |
| *G09B 1/06* | (2006.01) |
| *G09B 1/30* | (2006.01) |
| *G09B 17/00* | (2006.01) |
| *A63F 3/00* | (2006.01) |
| *G09B 1/04* | (2006.01) |
| *A63F 3/04* | (2006.01) |

(52) U.S. Cl.
CPC ............ *G09B 1/00* (2013.01); *A63F 3/00574* (2013.01); *A63F 3/0423* (2013.01); *G09B 1/04* (2013.01); *G09B 1/06* (2013.01); *G09B 1/30* (2013.01); *G09B 17/00* (2013.01)

(58) Field of Classification Search
None
See application file for complete search history.

(56) References Cited

U.S. PATENT DOCUMENTS

| | | | | |
|---|---|---|---|---|
| 3,774,319 A | * | 11/1973 | Sprowls ............... | G09B 21/003 434/164 |
| 5,203,706 A | * | 4/1993 | Zamir .................... | G09B 1/16 434/159 |
| 5,833,465 A | * | 11/1998 | Jarzewiak ............... | G09B 1/36 434/171 |
| 6,271,453 B1 | | 8/2001 | Hacker | |
| 7,018,210 B2 | | 3/2006 | Goldman et al. | |
| 2010/0273133 A1 | * | 10/2010 | Lehmann ................. | G09B 1/30 434/160 |
| 2015/0076767 A1 | * | 3/2015 | Benedict, III ....... | A63F 3/00574 273/266 |

* cited by examiner

Primary Examiner — Jason T Yen

(57) ABSTRACT

A multisensory learning system incorporates a plurality of connectable multisensory elements. Each multisensory element may be a piece, a tile, or a block, and includes a surface containing a single character recessed into the surface to form a track. The track may guide a user's finger into the recessed area containing a tactile pattern at a base thereof. The tactile pattern heightens the sensory perception of the character to aid in learning. Each multisensory element is capable of being attached to another multisensory element in order to string characters together. In use, tracing of the tactile pattern of the character triggers the combination of sensations of kinesthetic learning through the motion of tracing and tactile learning through the feel of the tactile pattern in the recessed characters. This may be combined with audiovisual learning by looking at the character(s) and speaking the name.

24 Claims, 2 Drawing Sheets

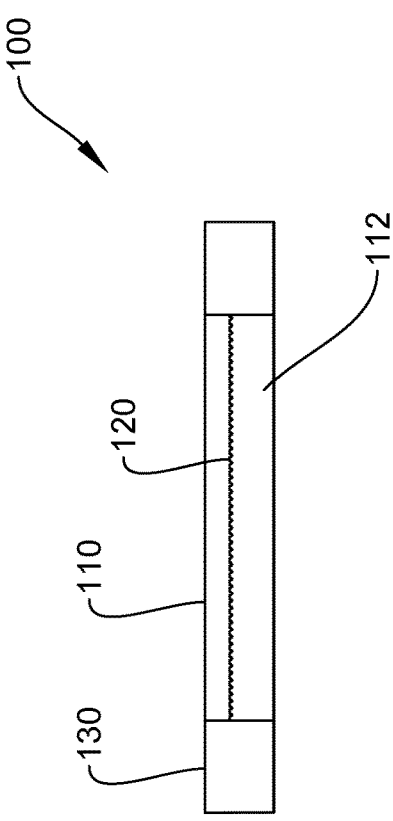
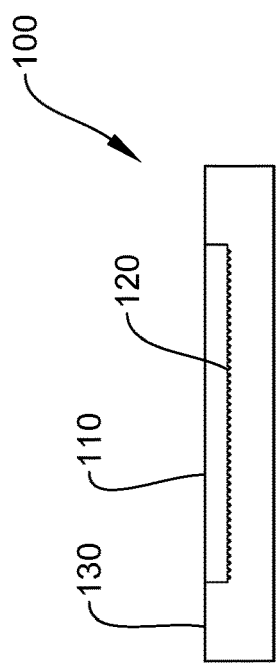
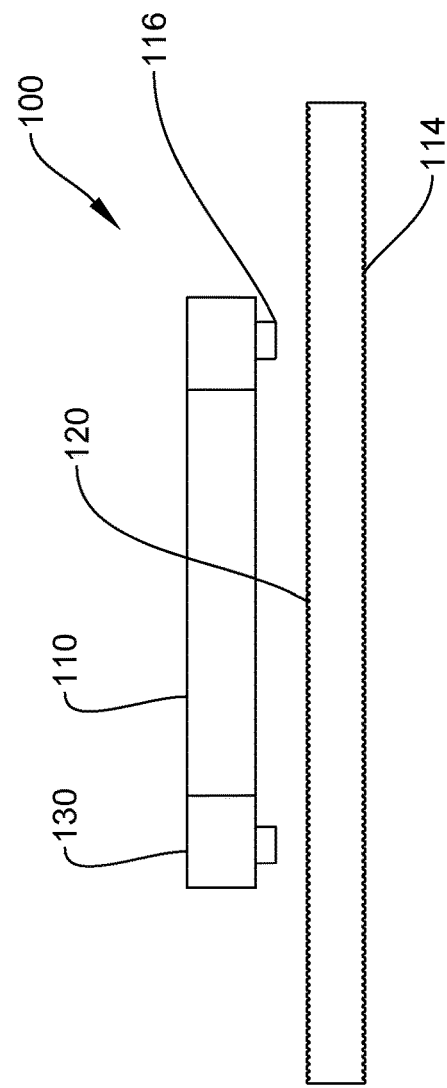
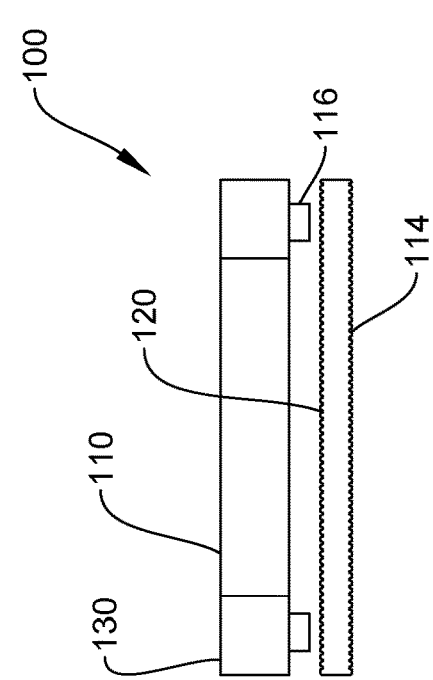
FIG. 4A
FIG. 4B
FIG. 4C
FIG. 4D

MULTISENSORY LEARNING DEVICES AND SYSTEM FOR TEACHING USING THE METHOD OF MULTISENSORY LEARNING

CROSS-REFERENCE TO RELATED APPLICATION

This application claims priority from and the benefit under 35 U.S.C. § 119(a) of U.S. Provisional Patent Application No. 62/516,097, filed on Jun. 6, 2017, the entire disclosure of which is incorporated by reference herein for all purposes.

BACKGROUND

1. Field of Disclosure

The present disclosure relates to a multisensory learning devices and a system for teaching through the method of multisensory learning. More particularly, the present disclosure relates to learning devices in the form of interlocking multisensory elements, such as tiles or blocks, which may be used together as a system for teaching through the method of multisensory learning.

2. Description of the Related Art

School aged children, as well as children and others with learning disabilities, often have trouble memorizing characters such as letters and numbers, as well as combinations of characters such as words and sentences. Most of the time, when characters and combinations of characters are being taught, only the audiovisual method is used. An example of a prior art system using the audiovisual learning method is U.S. Pat. No. 6,271,453 to L. Leonard Hacker.

When the audiovisual method is ineffective, teachers may turn towards other learning methods such as kinesthetic/tactile or read/write learning methods. However the previously mentioned methods may not be enough on their own, making it necessary to combine several together into a multisensory learning method. Various prior art devices have been developed relating to multisensory learning.

One such prior art device, U.S. Pat. No. 3,774,319, provides a method for teaching through tactile learning using a block with a recessed letter and physical indicia. Another such prior art device, U.S. Pat. No. 7,018,210, includes a system of blocks with letters and combinations of letters to teach reading through the audiovisual method. These prior art devices and methods, however, fail to provide a device or devices that adequately incorporate multisensory learning. Further, these prior art devises are limited in that they only teach letters, words, letters and words, or numbers.

Accordingly, it would be desirable to a system for multisensory learning that incorporates a multisensory learning method for characters and combinations of characters.

SUMMARY

In order to address these concerns, the present inventive concepts provide a system of devices that incorporates a multisensory learning method for characters and combinations of characters.

The present inventive concepts may incorporate any character, or combination of characters, including, but not limited, to letters, words, sentences, numbers, mathematical operators, or mathematical expressions.

Exemplary embodiments of the inventive concepts provide a multisensory element including a body that has a character area, a peripheral area surrounding the character area. The character area is recessed relative to the peripheral area to form a character-shaped track. The character area comprises a tactile pattern at a bottom of the character-shaped track.

In various embodiments, the body may further comprise a first interlocking surface at a first side of the peripheral area, and a second interlocking surface at a second side of the peripheral area opposite the first side of the peripheral area. The first and second interlocking surfaces may be complementary to each other.

In various embodiments, the character area may be formed as a stencil through the body and the tactile pattern may be disposed on a backing material. The backing material may be fixed to the body or may be separate from the body. When separate from the body, the body may comprise an element for attaching to the backing material selected from the group consisting of interlocking elements, hook and loop elements, and magnetic elements.

In various embodiments, the character area may be formed as a stencil through the body and the tactile pattern may be disposed on an insert material having a thickness less than a thickness of the body.

In various embodiments, the tactile pattern may have a texture different and distinct from a texture of the peripheral area.

In various embodiments, the peripheral area may be substantially rectangular in shape or may be substantially square in shape.

In various embodiments, the body may be substantially planar and may form a tile.

In various embodiments, the peripheral area may be substantially planar and the body may form a block.

In various embodiments, the first interlocking surface may include an edge with at least one indentation and at least one projection, and the second interlocking surface may include an edge with at least one complementary projection and at least one complementary indentation.

In various embodiments, the at least one indentation may include a plurality of indentations and the at least one projection may include a plurality of projections, and the at least one complementary projection may include a plurality of projections and the at least one complementary indentation may include a plurality of indentations.

Exemplary embodiments of the inventive concepts also provide a multisensory learning system that includes a plurality of multisensory elements. Each multisensory element may include a body that has a character area and a peripheral area surrounding the character area. The character area may be recessed relative to the peripheral area to form a character-shaped track. The character area may include a tactile pattern at a bottom of the character-shaped track. The character areas of each multisensory element may be selected from the group consisting of letters, numbers, mathematical operators, mathematical expressions, words, and punctuation marks.

In various embodiments of the multisensory learning system, each body may further comprise a first interlocking surface at a first side of the peripheral area, and a second interlocking surface at a second side of the peripheral area opposite the first side of the peripheral area. The first and second interlocking surfaces may be complementary to each other.

In various embodiments of the multisensory learning system, each character area may be formed as a stencil through the body and the tactile pattern may be disposed on a backing material. The backing material may be fixed to each body or may be a separate from each multisensory element and sized to accommodate a plurality of multisensory elements. When separate from the multisensory elements, each body may comprise an element for attaching to the backing material selected from the group consisting of interlocking elements, hook and loop elements, and magnetic elements.

In various embodiments of the multisensory learning system, the character area may be formed as a stencil through the body and the tactile pattern may be disposed on an insert material having a thickness less than a thickness of the body.

In various embodiments of the multisensory learning system, each tactile pattern may have a texture different and distinct from a texture of the peripheral area.

In various embodiments of the multisensory learning system, a shape of each peripheral area may be selected from the group consisting of substantially rectangular in shape and substantially square in shape.

In various embodiments of the multisensory learning system, each peripheral area may be substantially planar and the body may form a tile or a block.

In various embodiments of the multisensory learning system, the first interlocking surface may include an edge with at least one indentation and at least one projection, and the second interlocking surface may include an edge with at least one complementary projection and at least one complementary indentation.

In various embodiments of the multisensory learning system, the at least one indentation may include a plurality of indentations and the at least one projection may include a plurality of projections, and the at least one complementary projection may include a plurality of projections and the at least one complementary indentation may include a plurality of indentations.

In various embodiments of the multisensory learning system, the multisensory elements may interlock to form words, sentences, mathematical expressions, or combinations thereof.

The foregoing general description and the following detailed description are exemplary and explanatory and are intended to provide further explanation of the claimed subject matter.

BRIEF DESCRIPTION OF THE DRAWINGS

The above and other advantages of the present disclosure will become readily apparent by reference to the following detailed description when considered in conjunction with the accompanying drawings wherein:

FIGS. 4A, 4B, 4C, and 4D illustrate various alternative cross-sections according to exemplary embodiments of the present disclosure.

DETAILED DESCRIPTION

Figure 1:
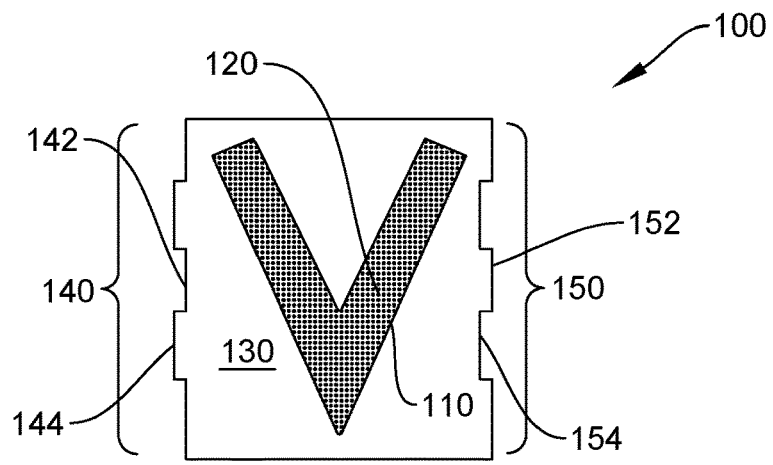
FIG. 1 is a plan view of a multisensory element according to an exemplary embodiment of the present disclosure.

It will be understood that when an element or layer is referred to as being "on", "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms, "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, the present invention will be explained in detail with reference to the accompanying drawings.

Figure 2:
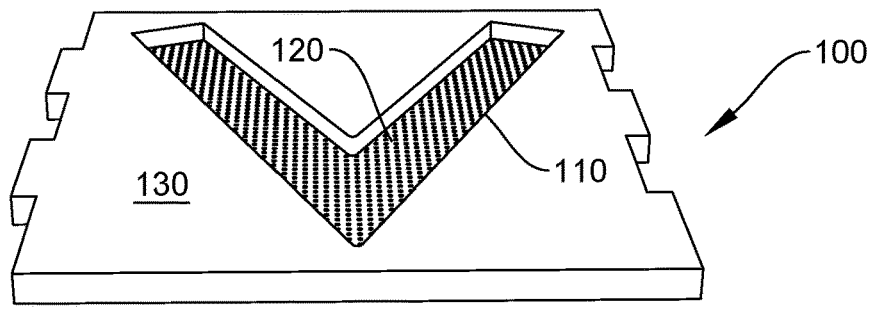
FIG. 2 is a perspective view of the multisensory element shown in FIG. 1.
Figure 3:
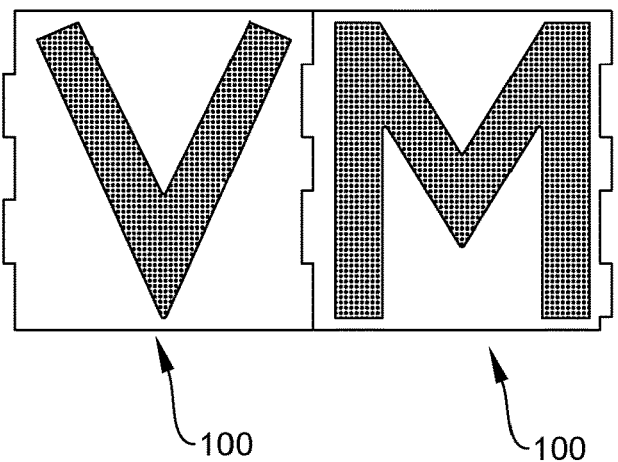
FIG. 3 is a plan view of a plurality of multisensory elements shown in FIG. 1 to form a system for multisensory learning according to an exemplary embodiment of the present disclosure.

FIG. 1 is a plan view of a multisensory element according to an exemplary embodiment of the present disclosure. FIG. 2 is a perspective view of the multi sensory element shown in FIG. 1. FIG. 3 is a plan view of a plurality of multisensory elements shown in FIG. 1 to form a system for multisensory learning according to an exemplary embodiment of the present disclosure.

Referring to FIGS. 1-3, a multisensory element 100 includes a body having character area 110 and a peripheral area 130 that surrounds the character area 110. The body, in this illustrated embodiment, further includes a first interlocking surface 140 at a first side of the peripheral area 130, and a second interlocking surface 150 at a second side of the peripheral area 130 opposite the first side of the peripheral area 130. However, exemplary embodiments of the present disclosure may omit these elements without departing from the scope of the inventive concepts.

The character area 110 is recessed relative to the peripheral area 130 to form a character-shaped track. The character area 110 includes a tactile pattern 120 at a bottom of the character-shaped track. FIG. 4A illustrates a cross section of an embodiment wherein the body of the multisensory element 100 is unitary. FIG. 4B illustrates a cross section of an embodiment wherein the character area 110 is formed as a stencil filled with an insert material 112 that comprises the tactile pattern 120.

The first and second interlocking surfaces 140 and 150, when included, are preferably complementary to each other. As used herein, "complementary" means that a portion of one interlocking surface fits in a matching relationship together with a corresponding portion of the other interlocking surface so as to join the two surfaces to each other. In this manner, one multisensory element 100 may be attached to an adjacent multisensory element 100.

In various embodiments, each character area 110 may be formed as a stencil through the body and the tactile pattern 120 may be disposed on a backing material 114. The backing material 114 may be fixed to each body, as illustrated in the cross section of FIG. 4C. Alternately, the backing material 114 may be a separate from each multisensory element 100 and sized to accommodate a plurality of multisensory elements 100, as illustrated in the cross section of FIG. 4D. When separate from the multisensory elements 100, each body may comprise an element 116 for attaching to the backing material 114. Any suitable element 116 may be used, including but not limited to interlocking elements, hook and loop elements, and magnetic elements.

As discussed above and illustrated in FIG. 4B, the character area 110 may be formed as a stencil through the body and the tactile pattern may be disposed on an insert material having a thickness less than a thickness of the body.

The tactile pattern 120 may have a texture different and distinct from a texture of the peripheral area 130. Exemplary tactile patterns include, but are not limited to, carpet or other woven textiles (which may be used as a backing material 114), patterns of raised dots, patterns of cylinders, patterns of geometric shapes, patterns of raised linear lines, patterns of raised curved lines, and patterns of intersecting lines.

The peripheral area 130 may be substantially rectangular in shape or may be substantially square in shape, but exemplary embodiments are not limited thereto, and various other shapes, such as circles, octagons, etc. may be used within the inventive concepts.

In various embodiments, the body may be substantially planar, such that the multisensory element 100 may form a tile, as illustrated in FIGS. 1-3. However, the inventive concepts are not limited thereto. For example, in various embodiments, the peripheral area 130 may be substantially planar, and the thickness of the body may be increased so as to form a block. In block or tile form, the multisensory element 100 may have multiple surfaces with character areas 110 and peripheral areas 130.

When used, the first interlocking surface 140 may include an edge with at least one indentation 142 and at least one projection 144, and the second interlocking surface 150 may include an edge with at least one complementary projection 152 and at least one complementary indentation 154. In various embodiments, the at least one indentation 142 may include a plurality of indentations 142 and the at least one projection 144 may include a plurality of projections 144. Further, the at least one complementary projection 152 may include a plurality of projections 152 and the at least one complementary indentation 154 may include a plurality of indentations 154.

In the form of a multisensory learning system, exemplary embodiments include a plurality of multisensory elements 100 in accordance with any of the various exemplary embodiments. In the embodiment of FIGS. 1-3, each multisensory element 100 may include a body that has a character area 110 and a peripheral area surrounding the character area 130.

The character area 110 may be recessed relative to the peripheral area 130 to form a character-shaped track. The character area 110 may include a tactile pattern 120 at a bottom of the character-shaped track.

In an exemplary embodiment of the multisensory learning system, each body may include a first interlocking surface 140 at a first side of the peripheral area, and a second interlocking surface 150 at a second side of the peripheral area 130 opposite the first side of the peripheral area 130. The first and second interlocking surfaces 140 and 150 may be complementary to each other. The character areas 110 of each multisensory element 100 may be selected from the group consisting of letters, numbers, mathematical operators, mathematical expressions, words, and punctuation marks.

In the multisensory learning system, each tactile pattern 120 may have a texture different and distinct from a texture of the peripheral area. A shape of each peripheral area 130 may be selected from the group consisting of substantially rectangular in shape and substantially square in shape. Each peripheral area 130 may be substantially planar and the body may form a tile or a block. The first interlocking surface 140 may include an edge with at least one indentation 142 and at least one projection 144, and the second interlocking surface 150 may include an edge with at least one complementary projection 152 and at least one complementary indentation 154. The at least one indentation 142 may include a plurality of indentations 142 and the at least one projection 144 may include a plurality of projections 144, and the at least one complementary projection 152 may include a plurality of projections 152 and the at least one complementary indentation 154 may include a plurality of indentations 154. Further, although disclosed as indentations and projections, any other suitable interlocking surface may be used without departing from the scope of the inventive concepts.

In various embodiments of the multisensory learning system, each character area 110 may be formed as a stencil through each body and the tactile pattern 120 may be disposed on a backing material 114. The backing material 114 may be fixed to each body, as illustrated in the cross section of FIG. 4C. Alternately, the backing material 114 may be a separate from each multisensory element 100 and sized to accommodate a plurality of multisensory elements 100, as illustrated in the cross section of FIG. 4D. When separate from the multisensory elements 100, each body may comprise an element 116 for attaching to the backing material 114. Any suitable element 116 may be used, including but not limited to interlocking elements, hook and loop elements, and magnetic elements.

As discussed above and illustrated in FIG. 4B, the character area 110 may be formed as a stencil through the body and the tactile pattern 120 may be disposed on an insert material 112 having a thickness less than a thickness of the body.

In the multisensory learning system, the multisensory elements 100 may be positioned adjacent to each other or interlock to form words, sentences, mathematical expressions, or combinations thereof.

For a single character, a user may select one multisensory element 100. The user then traces their finger inside the recessed track of character area 110 and slides it along a tactile pattern 120 in the recessed area of the character, triggering the combination of sensations of kinesthetic learning through the motion of tracing and tactile learning through the feel of the tactile pattern 120 in the recessed character.

For multiple characters, the user may select any number of multisensory elements 100. The user may then combine the multisensory elements 100 into a single string of characters. The user then traces their finger in the recessed track of characters areas 110, triggering the combination of sensations of kinesthetic learning through the motion of tracing and tactile learning through the feel of the tactile pattern 120 in the recessed characters. In addition, if the user is able to see and hear, they can also incorporate audiovisual learning with the use of the multisensory elements 100 by seeing the character as they look at a multisensory element 100 and saying its name out loud.

The combination of a minimum of two learning methods when using the multisensory elements 100 causes multisensory learning which is far superior to any single method used alone, allowing the user to more easily learn the desired characters or combination of characters.

In an aspect of the inventive concepts, a multisensory learning system incorporates a plurality of connectable multisensory elements. Each multisensory element may be a piece, a tile, or a block, and includes a surface containing a single character recessed into the surface to form a track. The track may guide a user's finger into the recessed area containing a tactile pattern at a base thereof. The tactile pattern heightens the sensory perception of the character to aid in learning. Each multisensory element is capable of being attached to another multisensory element in order to string characters together. To aid in forming sentences, multisensory elements that lack a character may be provided to allow for spaces between words. In the alternative, multisensory elements lacking a peripheral area, wherein the character area fills the surface with a tactile pattern may be provided to allow for spaces between words.

In another aspect of the inventive concepts, tracing of the tactile pattern of the character by a user triggers the combination of sensations of kinesthetic learning through the motion of tracing and tactile learning through the feel of the tactile pattern in the recessed characters. These multisensory learning may be combined with audiovisual learning by looking at the character(s) and speaking the name for additional multisensory learning.

Although exemplary embodiments of the present invention have been described, it is understood that the present invention should not be limited to these exemplary embodiments but various changes and modifications can be made by one ordinary skilled in the art within the scope of the present inventive concepts as hereinafter claimed.

What is claimed is:

1. A multisensory element, comprising:
a body comprising:
an upper surface;
a lower surface parallel to the upper surface;
a character area disposed on the upper surface;
a peripheral area surrounding the character area; and
interlocking surfaces consisting of:
a first interlocking surface extending perpendicular to the upper surface between the upper surface and the lower surface at a first side of the peripheral area; and
a second interlocking surface extending perpendicular to the upper surface between the upper surface and the lower surface at a second side of the peripheral area opposite the first side of the peripheral area,
wherein:
the character area is recessed relative to the peripheral area to form a character-shaped track,
the character area comprises a tactile pattern at a bottom of the character-shaped track, and
the first and second interlocking surfaces are complementary to each other.

2. The multisensory element of claim 1, wherein the peripheral area is substantially rectangular in shape.

3. The multisensory element of claim 1, wherein the peripheral area is substantially square in shape.

4. The multisensory element of claim 2, wherein the body is substantially planar and forms a tile.

5. The multisensory element of claim 2, wherein the peripheral area is substantially planar and the body forms a block.

6. The multisensory element of claim 3, wherein the body is substantially planar and forms a tile.

7. The multisensory element of claim 3, wherein the peripheral area is substantially planar and the body forms a block.

8. The multisensory element of claim 4, wherein:
the first interlocking surface comprises an edge with at least one indentation and at least one projection, and
the second interlocking surface comprises an edge with at least one complementary projection and at least one complementary indentation.

9. The muitisensory element of claim 8, wherein:
the at least one indentation comprises a plurality of indentations and the at least one projection comprises a plurality of projections, and
the at least one complementary projection comprises a plurality of projections and the at least one complementary indentation comprises a plurality of indentations.

10. The multisensory element of claim 6, wherein:
the first interlocking surface comprises an edge with at least one indentation and at least one projection, and
the second interlocking surface comprises an edge with at least one complementary projection and at least one complementary indentation.

11. The multisensory element of claim 10, wherein:
the at least one indentation comprises a plurality of indentations and the at least one projection comprises a plurality of projections, and
the at least one complementary projection comprises a plurality of projections and the at least one complementary indentation comprises a plurality of indentations.

12. The multisensory element of claim 1, the character area is selected from the group consisting of letters, numbers, mathematical operators, mathematical expressions, words, and punctuation marks.

13. The multisensory element of claim 1, wherein the tactile pattern has a texture different and distinct from a texture of the peripheral area.

14. The multisensory element of claim 1, wherein the character area is formed as a stencil through the body,
the tactile pattern is disposed on a backing material, and
the body comprises an element for attaching to the backing material selected from the group consisting of an interlocking element, a hook and loop element, and a magnetic element.

15. The multisensory element of claim 1, wherein the character area is formed as a stencil through the body, and
the tactile pattern is disposed on an insert material having a thickness less than a thickness of the body.

16. A multisensory learning system, comprising:
a plurality of multisensory elements, each multisensory element comprising:
a body comprising:
an upper surface;
a lower surface parallel to the upper surface;
a character area disposed on the upper surface;
a peripheral area surrounding the character area; and
interlocking surfaces consisting of:
a first interlocking surface extending perpendicular to the upper surface between the upper surface and the lower surface at a first side of the peripheral area; and
a second interlocking surface extending perpendicular to the upper surface between the upper surface and the lower surface at a second side of the peripheral area opposite the first side of the peripheral area,
wherein:
the character area is recessed relative to the peripheral area to form a character-shaped track,
the character area comprises a tactile pattern at a bottom of the character-shaped track,
the first and second interlocking surfaces are complementary to each other, and
wherein the character area of each multisensory element is selected from the group consisting of letters, numbers, mathematical operators, mathematical expressions, words, and punctuation marks.

17. The multisensory learning system of claim 16, wherein a shape of each peripheral area is selected from the group consisting of substantially rectangular in shape and substantially square in shape.

18. The multisensory learning system of claim 16, wherein each peripheral area is substantially planar and the body forms a tile or a block.

19. The multisensory learning system of claim 16, wherein:
each first interlocking surface comprises an edge with at least one indentation and at least one projection, and
each second interlocking surface comprises an edge with at least one complementary projection and at least one complementary indentation.

20. The multisensory learning system of claim 19, wherein:
each at least one indentation comprises a plurality of indentations; and each at least one projection comprises a plurality of projections, and
each at least one complementary projection comprises a plurality of projections and each at least one complementary indentation comprises a plurality of indentations.

21. The multisensory learning system of claim 16, wherein the multisensory elements interlock to form words, sentences, mathematical expressions, or combinations thereof.

22. The multisensory learning system of claim 16, wherein each tactile pattern has a texture different and distinct from a texture of the peripheral area.

23. The multisensory learning system of claim 16, wherein each character area is formed as a stencil through each body,
the tactile pattern is disposed on a backing material, and
each body comprises an element for attaching to the backing material selected from the group consisting of interlocking elements, hook and loop elements, and magnetic elements.

24. The multisensory learning system of claim 16, wherein each character area is formed as a stencil through each body, and
each tactile pattern is disposed on an insert material having a thickness less than a thickness of the corresponding body.

* * * * *